UNITED STATES PATENT OFFICE.

MARTIN FLEGLE, OF MINNEAPOLIS, MINNESOTA.

COMPOSITION OF MATTER TO BE USED FOR PLASTERING.

SPECIFICATION forming part of Letters Patent No. 393,002, dated November 20, 1888.

Application filed April 14, 1888. Serial No. 270,651. (No specimens.)

*To all whom it may concern:*

Be it known that I, MARTIN FLEGLE, a citizen of the United States, residing at Minneapolis, in the county of Hennepin and State of Minnesota, have invented a new and useful Composition of Matter to be Used for Plastering; and I do hereby declare that the following is a full, clear, and exact description of the same.
My composition consists of the following ingredients, combined in about the proportions stated, viz: Paper-pulp, four parts; wool fiber, one part; sawdust, two parts, lime putty, two parts; flour paste, one part, the flour paste containing alum in proportion of about two ounces to the gallon of paste. To these is added sufficient water to reduce the mass to a suitably plastic condition to use for plastering in the usual manner. The water so added should contain copperas in solution in proportion of two ounces to the gallon, and salt one pound to the gallon.

In mingling the ingredients I prefer to first reduce the mixture of paper-pulp, wool fiber, and sawdust to the desired consistency by the addition of the water, as stated, and then add the lime-putty and flour paste.

The composition, applied to surfaces in the usual way, will, when dry, constitute a tenacious and durable plastering.

The plastering can be rendered harder, if desired, by the addition to the above composition of silicate of soda in proportion of about one ounce to the gallon, or by the addition of plaster equal to about one-fourth the bulk of the composition.

What I claim, and desire to secure by Letters Patent, is—

The herein-described composition of matter, consisting of paper-pulp, wool fiber, sawdust, lime putty, flour paste, and water having salt and copperas in solution, substantially as set forth.

MARTIN FLEGLE.

Witnesses:
   C. E. CHURCHILL,
   P. H. GUNCKEL.